Nov. 30, 1971  B. J. CALDWELL  3,623,229
CHART AND INSTRUMENT CALIBRATORS
Filed Sept. 29, 1969  3 Sheets-Sheet 1

Bruce J. Caldwell
INVENTOR

BY Arnold, Roylance,
Kruger & Durkee
ATTORNEYS

Nov. 30, 1971  B. J. CALDWELL  3,623,229
CHART AND INSTRUMENT CALIBRATORS
Filed Sept. 29, 1969  3 Sheets-Sheet 2

Bruce J. Caldwell
INVENTOR

BY Arnold, Roylance,
Kruger & Durkee
ATTORNEYS

Nov. 30, 1971 B. J. CALDWELL 3,623,229
CHART AND INSTRUMENT CALIBRATORS
Filed Sept. 29, 1969 3 Sheets-Sheet 3
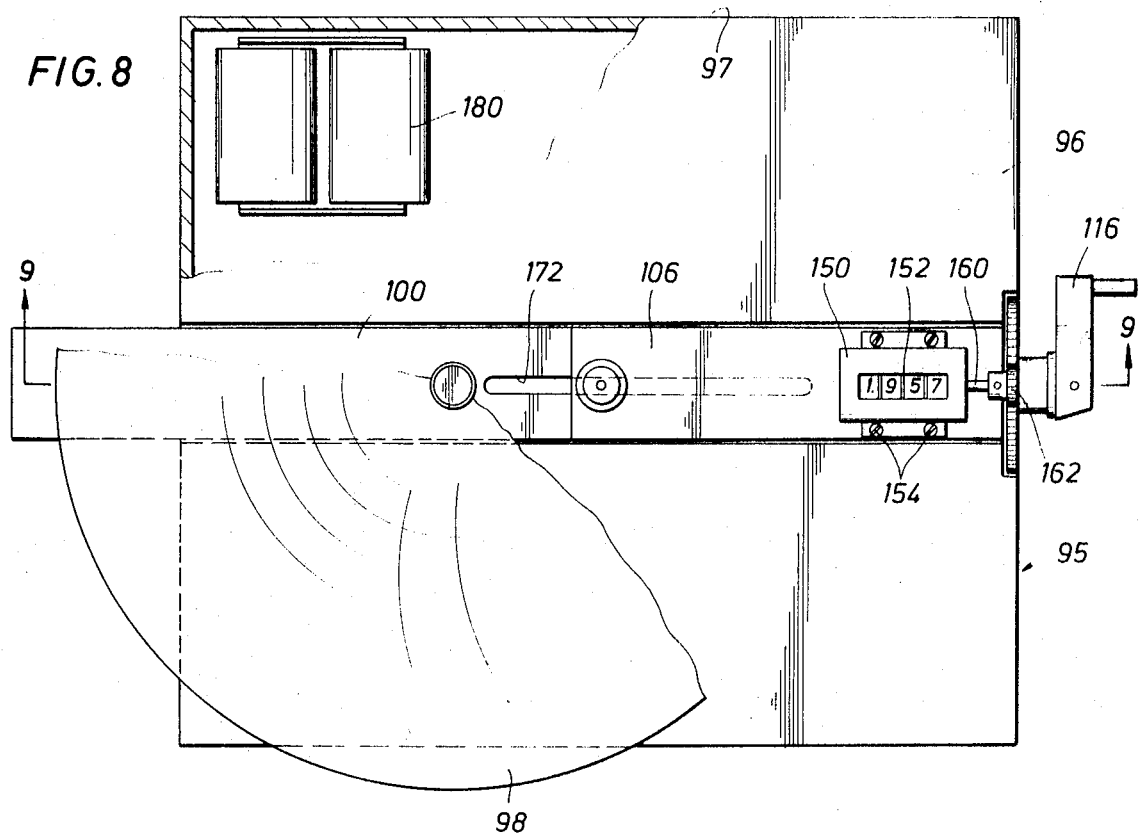
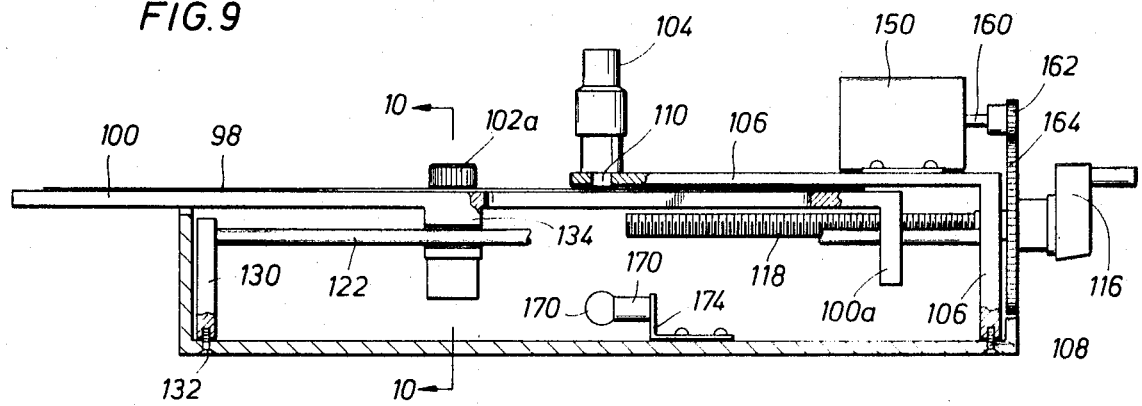
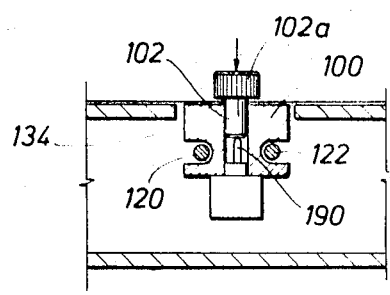
Bruce J. Caldwell
INVENTOR
BY Arnold, Roylance,
Kruger & Durkee
ATTORNEY

United States Patent Office 3,623,229
Patented Nov. 30, 1971

3,623,229
CHART AND INSTRUMENT CALIBRATORS
Bruce J. Caldwell, Houston, Tex., assignor to Tejas
Instrument Engineers, Inc., Houston, Tex.
Filed Sept. 29, 1969, Ser. No. 863,024
Int. Cl. G01c 15/12
U.S. Cl. 33—46 R
22 Claims

ABSTRACT OF THE DISCLOSURE

One model calibrator is similar to a vernier caliper but has a male member that mates with a circular chart center hole and has an optical sight and reticle. Readings can be taken with this instrument to check either the accuracy of industrial instrument recordings or their chart imprints. In another model the calibrator is provided with a female member that fits snugly over mounting hubs of turntables associated with recorder chart drives and data processing equipment.

A desk model provides the capability of spot-checking of charts and calibrating instruments. It features digital readout and a carriage mechanism that can be actuated by a hand crank or servo motor. This configuration is best equipped with a light source for added illumination. It also features a magnified reticle for ease in obtaining precision measurements.

BACKGROUND OF THE INVENTION

This invention relates generally to calibration instruments, and, more specifically, to instruments for calibrating circular charts and circular chart recorders and data processing equipment.

DESCRIPTION OF THE PRIOR ART

Many types of currently used measurement devices employ a circular paper chart on which a pen or marking instrument produces a trace or other marking to indicate the level of the measurement made related to time in a chart's rotation. For example, in many areas of manufacturing and industry, circular chart recorders are used in both field and office locations to monitor and record such parameters as fluid static pressure, flow rate, temperature and various other parameters of fluids. Such charts often serve as the basis for process control, calculating charges and for input to accounting procedures. In the usual procedure the charts from the field recorders are brought to a central office location and are interpreted both by human operators and by machines. For instance, the circular charts are interpreted by such machines as electroscanners and manually operated chart integrators.

In the past relatively little attention has been focused upon the accurate calibration of either field chart recorders and office data processing equipment through the use of micrometric measuring tools or upon the accuracy of the printed markings on the circular charts used with these recorders. The circular charts are typically printed with markings indicating units of measurement, such, for example, as time related to pressure or other variables. It has been the practice in the past to rely upon the accuracy of the markings on such paper charts to calibrate and adjust the field recording instruments and also the office data processing machines.

Many have failed to take note of the potential errors created by relying upon such paper charts. Few seem to realize that these circular charts are in effect "paper yardsticks" that do not provide accurate and precise calibration of recorders and data processing instruments. It is well known in the printing industry that paper has a grain and even with high quality paper the dimensions of paper varies with the humidity and temperature.

Further sources of error arise in the use of paper charts to calibrate industrial recorders because of variations in the location and size of the chart's mounting hole which is provided to fit over the mounting hub of the recorder or data reduction instrument. In the manufacture of circular charts, it is critical that all chart imprints be oriented to the center of the mounting hole punched into the chart. Even with the most careful printing practices, certain errors may be created during the printing process and punching center hole or during the manufacture of the printing plate. Yet, testing of the accuracy of such paper charts is rarely done.

Such practices in the industrial recording arts are in sharp contrast with what has been long standing practice in other industrial measurement arts. For example, in manufacturing plants and machine shops high precision calipers and micrometers are used to measure and check manufacturing machines and fabricated parts. Such micrometers and calipers are frequently measured and tested against standard units which are traceable to the U.S. Bureau of Standards.

SUMMARY OF THE INVENTION

It is an object of this invention to provide a better reference standard than a printed paper chart to calibrate industrial circular chart recorders, associated data reduction devices and, simultaneously, provide means for the calibration of printed circular charts used with such recorders.

The invention may be embodied in various forms, but in one form which is especially adapted for portable use in field operations, it is similar to a vernier caliper. The portable model includes first and second members together with hand-actuated means for moving them linearly with respect to each other. If a recorder or data processing instrument is to be calibrated, the female coupling member is adapted to fit snugly over the hub of the recorder or data processing instrument. If a chart is to be calibrated, a male coupling member is provided to fit through the center hole of a circular chart and engage a mating indenture in a supporting surface. An eyepiece is secured to the other member and a magnified reticle is inclined in the eyepiece for sighting a location on the chart or instrument to be calibrated.

The invention can also be embodied in a desk or office model which is especially useful in spot-checking quantities of circular charts. The desk model includes a stationary base structure with supporting surface for a chart to be measured. A chart is secured to a movable member by a spindle through its center hole. An arm, which is secured to the base structure, extends over the top of a circular chart. The arm includes an eyepiece with a reticle for sighting a location on the chart. The movable member for supporting a chart is mounted on a carriage so that it can be moved by means of a hand crank or servo motor in a linear direction with respect to the eyepiece. A digital counter or readout device is connected by mechanical linkage to the carriage assembly so as to provide a continuous digital readout of the dimension between the center hole of the chart and the position shown through the reticle in the eyepiece.

BRIEF DESCRIPTION OF THE DRAWINGS

The invention will now be described by way of example by reference to the accompanying drawings, in which:

FIG. 8 is a plan view, partly cut away, of another model of the invention especially suited for desk or office use;

FIG. 9 is a side elevation, partly in section, of the device illustrated in FIG. 8; and FIG. 10 is a sectional elevation taken along lines 10—10 in FIG. 9.

DETAILED DESCRIPTION OF THE DRAWINGS

Figure 1:
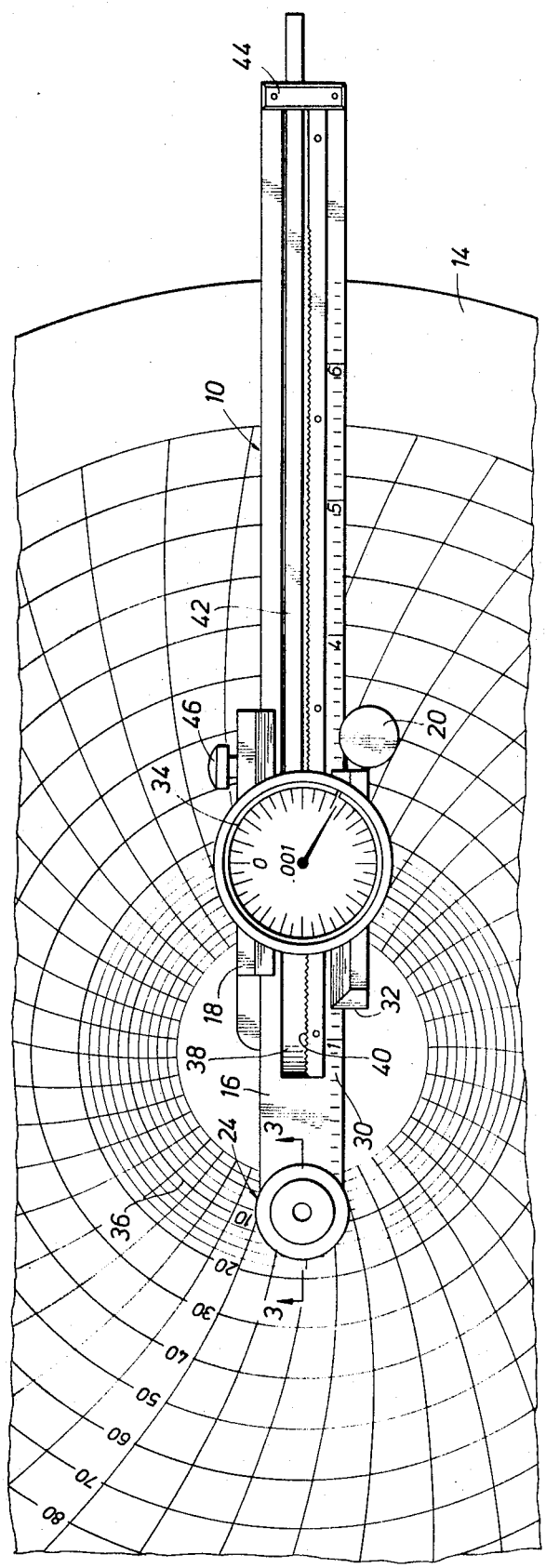
FIG. 1 is a plan view of a portable model of the invention supported over a circular chart.
Figure 2:
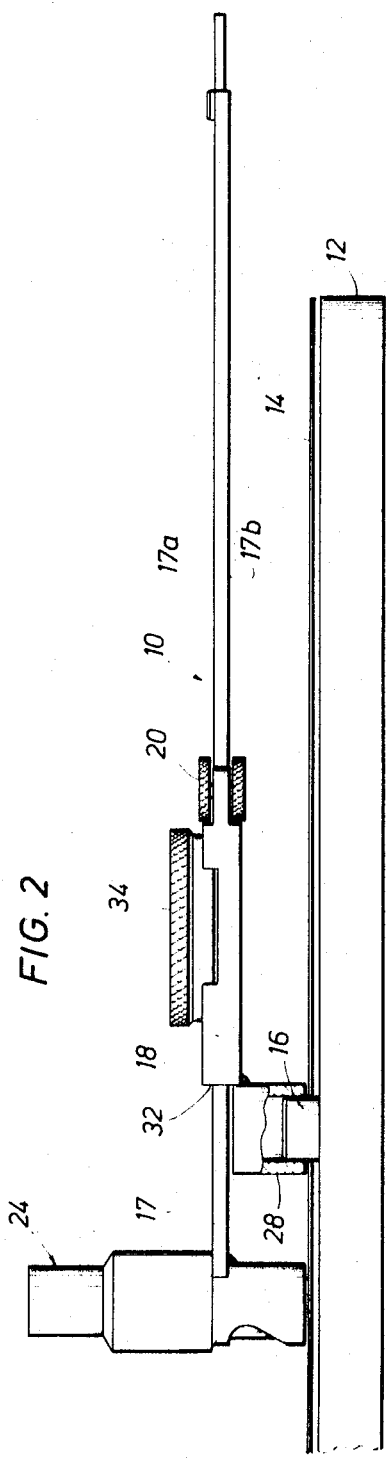
FIG. 2 is a side elevation of the device and chart of FIG. 1.

Referring now to FIGS. 1 and 2, there is shown a calibrator 10 constructed in accordance with the present invention. Calibrator 10 is shown in position on a turntable 12 of a recorder or other instrument. Placed on turntable 12 is a circular chart 14 which is mounted by means of center hole over a central hub 16.

The calibrator as shown includes a linear member 17 on which is fixed a slider unit 18. The linear member 17 and slider unit 18 are similar in construction to a common vernier caliper. The slider unit 18 is mounted so as to slide along the length of the linear member 17. A thumb actuated roller 20, which is mounted on an axis supported by the slider unit 18, contacts the upper and lower edges 17a and 17b of the linear member 17 in order to move the slider unit 18 longitudinally of the linear member 17.

At its outward end, the linear member 17 includes an eyepiece 24 which includes an internal magnified reticle for sighting a location on the chart 14. The slider unit 18 includes on its underside a female member 28 which is adapted to fit snugly over the hub 16.

Vernier scales 30 on the calibrator 10 provide an accurate reading of the distance between the center of the hub 16 and the location as shown in the center of the reticle sighted by the eye through the eyepiece 24. In the model illustrated, vernier scale 30 is graduated in inches and tenths of an inch. Yet other systems of linear measure may be substituted. A dial-type readout 34 indicates the reading for the hundredths and one thousandths place. The index for the vernier scale is formed by the edge 32 which is a part of the slider unit 18.

In order to make a reading, the female member 28 is placed over the hub 16 and the roller 20 is rotated until the linear member 17 is moved to the desired position as shown through the eyepiece 24. When the position at which a reading is to be taken has been adjusted, the reading is made from the vernier scale and from the dial 34. For example, in the position shown in the drawing, the reading is 1.2 inches plus the reading for the hundredths and thousandths digits as shown on the dial 34.

In calibrating an instrument it is of course not necessary to have a chart 14 with any markings on it. In fact, it would be just as well to have a blank piece of paper on which are scribed perfect circle markings by the stylus or implement which is used to make the recording or, in the case of data processing equipment, to trace the locus of the recorded traces. For example, assuming that the circular line 36 is a perfect circle as made by a recorded stylus or data processor stylus, the reticle in the eyepiece 24 could be aligned with the center of the circle 36 and then a reading taken from the scale to determine the exact radius from the center of the hub 16. By suitable geometry tables which are custom tailored for each individual recorder make and type, the reading of the radius can be compared with the reading as shown on the instrument to check for accuracy tolerance.

The details of the construction of the slider unit 18 and the linear member 17 are similar to conventional vernier calipers and will be described only briefly herein. Linear member 17 includes a longitudinal groove 38 in which is mounted a toothed rack 40. A pinion which is not shown in the drawing meshes with the teeth in rack 40 to actuate the pointer 34a in the dial 34. Thus, as the wheel 20 is rotated to move the linear member 17 with respect to the slider 18, the pointer 34a is rotated because of the pinion engagement with the toothed rack 40. Resting in the groove 38 is a guide element 42 which is retained by a plate 44 secured across the top of the linear member 17. A set screw 46 is provided to lock the slider unit 18 in positive connection with the linear member 17 when it is desired to take a reading.

Figure 3:
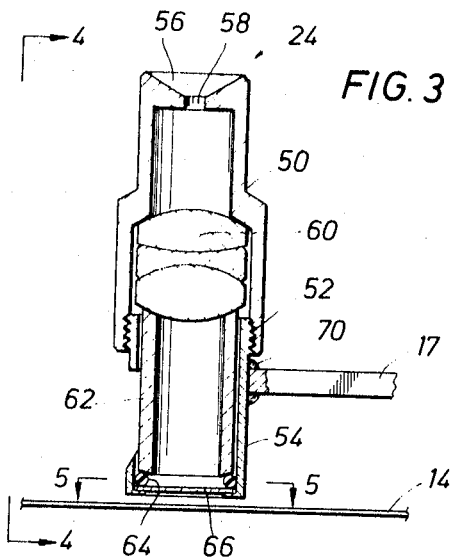
FIG. 3 is a sectional elevation taken along lines 3—3 in FIG. 1.
Figure 4:
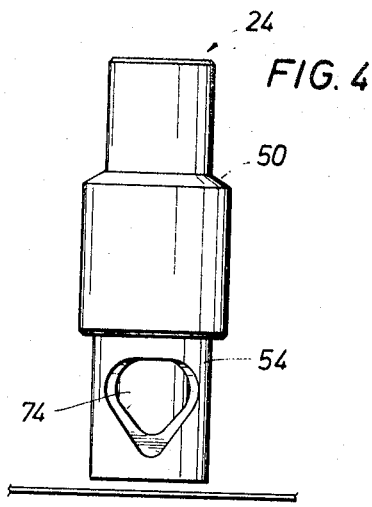
FIG. 4 is a front elevation taken along lines 4—4 in FIG. 3.
Figure 5:
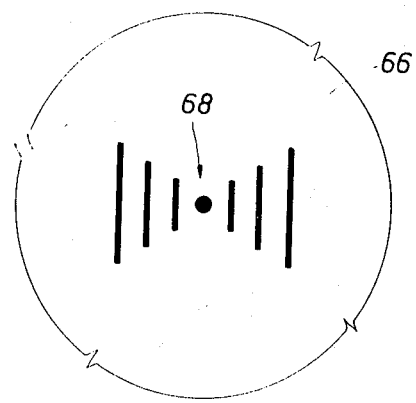
FIG. 5 is a plan view of the reticle lens taken along lines 5—5 in FIG. 3.

Further details of the eyepiece 24 will now be described with reference to FIGS. 3, 4 and 5. As shown, the eyepiece 24 includes an upper cylinder 50 which is secured by a threaded connection 52 to a lower cylinder 54. An indentation 56 and a bore 58 provides an opening for the eye to view into the eyepiece 24. A magnifying optics assembly 60 is provided in upper cylinder 50. The optics assembly 60 is supported by a transparent sleeve 62 which may be constructed of glass or plastic material, for example. The sleeve 62 rests on an O-ring 64 which is in turn supported on a transparent lens 66. Lens 66 includes the parallel markings and center dot 68 for the reticle of the eyepiece. The parallel markings are intended to orient the user in finding small dot 68 at the center of reticle.

The eyepiece 24 is shown secured to the linear member 17 by means of welding at 70 to the lower cylinder 54. A window or port 74 is formed in the side of the lower cylinder 54 in order to provide illumination through the transparent sleeve 62 for the visual sighting of the reticle.

Figure 6:
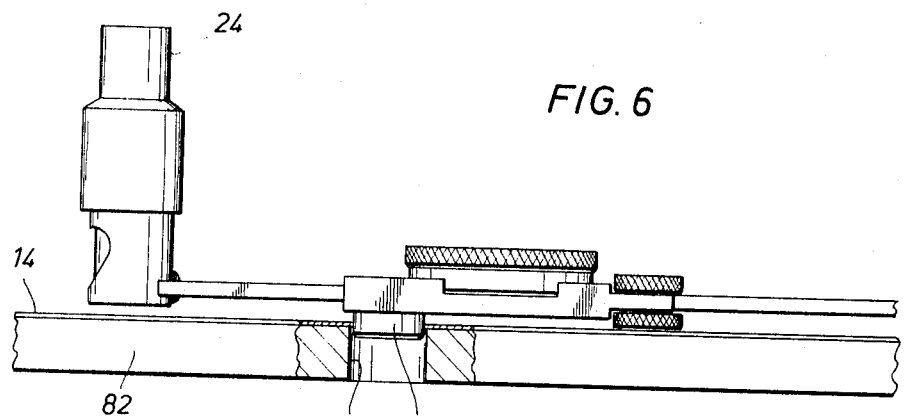
FIG. 6 is a side elevation of another model of the invention provided with a male coupling member.

In FIG. 6 there is shown another embodiment of the invention which is designed for portable use in calibrating circular charts at a field location.

The device shown in FIG. 6 is similar in all respects to the device described above with respect to FIGS. 1–5 except that it includes a male member 80 secured to the underside of the slider unit 18. Male member 80 is designed to fit snugly through the center hole of chart 14. A supporting surface 82 may be provided with a mating indenture 84, for example, in the side of the storage box for the calibrator.

Figure 7:
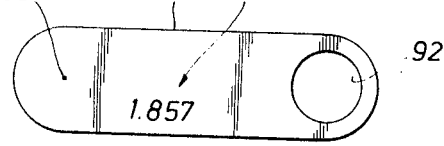
FIG. 7 is a plan view of the calibration standard for calibrating the device illustrated in FIG. 2.

Shown in FIG. 7 is a reference standard unit for checking the scale readings of the calibrator illustrated in FIG. 6. The reference standard unit 90, which is preferably constructed of metal, includes a hole 92 which fits tightly around the male member 80 and a scribe mark 93 which may be a hole perforated. The distance between the center of hole 92 and the scribe mark 93 is shown, for example, by the marking 94. Hence, to check the reading of the calibrator the male member 80 is inserted in the hole 92 and the scribe mark 93 is centered within the reticle of eyepiece 24. The reading of the calibrator is then adjusted where necessary to correspond with the reference distance. Means for adjusting the instrument to calibration standard 90 is not depicted.

Turning now to FIGS. 8 and 9, there will be described still another embodiment of the present invention which is designed primarily for desk or office use, reflecting features that afford added utility value. The unit includes a rectangular shaped box 95 having a half lid 96 which is hinged along the edge 97. A circular chart 98 is secured on a carriage mechanism including a movable member 100 by a spindle 102 which passes through the center hole of chart 98 and fits within a mating recess of the movable member 100. An enlarged knob 102a is mounted atop the spindle 102 in order to provide a grip for inserting and removing the spindle 102.

An eyepiece 104 is secured to the outer end of a right angle bracket 106 which is secured to the bottom edge of the box 95 by screws, one of which is illustrated at 108.

The circular chart 98 slides between the bracket 106 and the upper surface of the box 95.

The eyepiece 104 can be similar in construction to the eyepiece described above in connection with FIGS. 3–6. It may include, for example, a magnified reticle assembly to aid in sighting a location on the chart 98. A bore 110 is provided in the bracket 106 to provide an open line of sight through the eyepiece 104 to a location on the chart 98.

The carriage mechanism for shifting the movable member 100 linearly with respect to the eyepiece 104 includes a hand crank 116 which is secured to a lead screw 118. Lead screw 118 is mounted at one end in bearings in the bracket 106 and passes through a threaded opening in the right angle bracket portion 100a of the movable member 100. Thus when the crank 116 is rotated the right angle bracket portion 100a is moved longitudinally along the lead screw 118. It is obvious that a drive motor may be substituted for the hand crank depicted.

The guide structure for the carriage mechanism includes a pair of rods 120 and 122 which are mounted at one end in the end bracket 106 and at the other end in a bracket 130 which is secured to the bottom of the box 95 by screw 132. The movable member 100 includes on its underneath side an extended portion forming a guide block 134 which has grooves that fit around the rods 120 and 122. Hence, the guide block 134 slides along the rods 120 and 122 as rotation of the hand crank 116 causes rotation of the lead screw 118 and longitudinal movement of the right angle bracket portion 100a.

A digital readout of the dimensions between the location sighted through the eyepiece 104 and the center of the chart mounting hole is provided by a digital counter 150 which includes number wheels 152. Counter 150 is secured by a bracket and set screws 154 to the upper face of the bracket 106. Counter 150 is linked mechanically to the lead screw 118 by a gear train which includes a shaft 160 on the end of which is located a spur gear 162. Gear 162 meshes with a large spur gear 164 which is secured to rotate with a hand crank 116. Thus, the distance between the center of the spindle 102 and the center point of the reticle in eyepiece 104 is transmitted to the digital counter 150 by the rotation of the gears 164 and 162 and shaft 160. The digital counter 150 may be calibrated and adjusted to provide a readout in whatever units are desired such as inches and $1/1000$ of an inch.

To aid in sighting a location on the chart 98 through the eyepiece 104, a novel illumination means is provided. A small incandescent lamp 170 provides illumination which shines through the slot 172 in the movable member 100 and through the bore 110 to the reticle inside eyepiece 104. The lamp 170 is mounted in a socket 172 which is secured to a bracket 174 mounted by screws to the bottom side of the box 95. The lamp 170 is connected by wires which are not shown in the drawing to a battery pack 180. The circuit between the battery pack 180 and the lamp 170 is completed by a novel switch assembly which is actuated by depressing the knob 102a. Below knob 102a is a plunger 190 which closes unshown switch contacts in the circuit with the lamp 170 and battery pack 180. Thus, inspection of the chart 98 through the eyepiece 104 can be accomplishd very conveniently by pressing with the hand on the knob 102a.

Of course, it will be obvious that there can be other arrangements which are suitable for illuminating the location on the chart 98 to be inspected through the eyepiece 104. In certain applications, an illumination system may be desirable which is powered by other than a battery source. Also, the lamp could be located above, instead of beneath, a chart where the chart material or thickness causes it to be opaque and not allow light transmittance.

What is claimed is:

1. A calibration device, comprising:
    a first member;
    a second member;
    means for moving said first and second members linearly with respect to each other;
    a mechanical coupling attached to said first member, said coupling being adapted to engage a mechanical mating coupling carried by that which is to be calibrated;
    an eyepiece secured to said second member;
    a reticle in said eyepiece for sighting a location on what is to be calibrated; and
    means for reading the dimension between said coupling and said eyepiece.

2. A calibration device as defined in claim 1 wherein said coupling comprises:
    a female member adapted to fit over a mating male member.

3. A calibration device as defined in claim 1 wherein said coupling comprises:
    a male member adapted to fit with a mating female member.

4. A calibration device as defined in claim 1 further comprising:
    means for illuminating said eyepiece to aid in sighting a location on what is to be calibrated.

5. A calibration device as defined in claim 1 wherein said means for reading the dimension between said coupling and said eyepiece comprises:
    a digital counter mounted on one of said first and second members;
    a mechanical linkage connecting said digital counter to the other of said first and second members, such that said digital counter may indicate a reading of the dimension between said coupling and said eyepiece.

6. A calibration device as defined in claim 1 wherein said means for reading the dimensions between said coupling and said eyepiece comprises:
    vernier scales marked in said first and second member.

7. A calibration device as defined in claim 1 wherein said means for moving said second member linearly with respect to said first member comprises:
    a thumb-actuated wheel pivoted on said first member, said thumb-actuated wheel being adapted to engage said second member whereby rotation of said wheel causes movement of said second member with respect to said first member.

8. A calibration device comprising:
    a longitudinal member;
    a slideable unit mounted to slide longitudinally of said longitudinal member;
    a manually-actuated means for moving said longitudinal member and said slideable member with respect to each other;
    a coupling member secured to said slideable member, said coupling member being adapted to engage a mating coupling on what is to be calibrated;
    an eyepiece secured to said longitudinal member, said eyepiece having a line of sight which is substantially perpendicular to said longitudinal member;
    a reticle mounted in said eyepiece; and,
    means for reading the relative position between said coupling and said eyepiece.

9. A calibration device as defined in claim 8 wherein said longitudinal member includes a vernier scale readble in cooperation with an index on said slideable member.

10. A calibration device as defined in claim 9 further comprising:
    a dial and pointer arrangement for reading the least significant digit in cooperation with a vernier reading.

11. A calibration device as defined in claim 8 wherein said means for moving said longitudinal member and said slideable member with respect to each other includes a wheel which is mounted about an axis secured to said slideable member, said wheel being adapted to engage the edge of said longitudinal member whereby rotation of said wheel effects movement between said longitudinal member and said slideable member.

12. A calibration device as defined in claim 8 wherein said eyepiece comprises:
a cylindrical unit mounted perpendicularly to said longitudinal member, a transparent port being formed in the side of said cylindrical unit to permit the entrance of light to illuminate said reticle.

13. A calibration device as defined in claim 8 wherein said coupling member comprises:
a female member adapted to fit over a mating male member.

14. A calibration device as defined in claim 8 wherein said coupling member comprises:
a male member adapted to engage with a mating female member.

15. A calibration device comprising:
a base structure having a supporting surface;
a movable member movable with respect to said supporting surface of said base structure;
means for securing a circular chart through its center hole to said movable member;
a carriage mechanism for supporting said movable member in longitudinal movement;
an arm secured to said base structure and extending over said movable member with a clearance therebetween;
an eyepiece secured to said arm;
a reticle mounted in said eyepiece;
means connected to said carriage mechanism for moving said movable member linearly with respect to said eyepiece; and
means for reading the dimension between said eyepiece and the center hole of a chart.

16. A calibration device as defined in claim 15 wherein said means for reading the dimension between said eyepiece and the center hole of a chart comprises:
a digital counter having a digital readout, said counter being coupled by a mechanical linkage to said carriage mechanism.

17. A calibration device as defined in claim 15 wherein said carriage mechanism comprises:
a pair of parallel rods mounted in said base structure; and
a guide block mounted for movement on said parallel rods and being secured to said movable member.

18. A calibration device as defined in claim 15 wherein said manually-actuated means comprises:
a hand crank;
a lead screw secured in said base structure and being adapted for rotation by said hand crank or motor;
a guide block having a threaded opening passing over said lead screw, said guide block being secured to said movable member, whereby rotation of said lead screw by said hand crank or motor results in longitudinal movement of said movable member.

19. A calibration device as defined in claim 15 further comprising:
means for illuminating said eyepiece.

20. A calibration device as defined in claim 15 wherein said means for illuminating said eyepiece comprises:
a power supply;
a lamp connected in circuit with said power supply, said lamp being located within said base structure and being adapted to shine through a translucent circular chart into said eyepiece.

21. A calibration device as defined in claim 20 further comprising a switch for actuating said lamp, said switch comprising:
a pair of contacts connected in circuit with said lamp and power supply;
a spindle mounted in said movable member for mounting of a circular chart through its center hole, said spindle being slideable in a recess in said guide block;
a plunger mounted in said guide block and being adapted to be actuated by depression of said spindle, said plunger being adapted to close said contacts upon depression of said spindle.

22. A calibration device, comprising:
a base structure having a supporting surface;
a movable member movable with respect to said supporting surface of said base structure;
means for securing a circular chart through its center hole to said movable member;
an arm secured to said base structure and extending over said movable member with clearance therebetween;
an eyepiece secured to said arm;
a reticle mounted in said eyepiece;
a pair of parallel rods mounted in said base structure;
a guide block mounted for movement on said parallel rods and being secured to said movable member;
a hand crank;
a lead screw secured in said base structure and being adapted for rotation by said hand crank, said lead screw passing through a threaded opening in said guide block, whereby rotation of said hand crank results in longitudinal movement of said movable member; and
a digital counter having a digital readout, said counter being coupled by a mechanical linkage to said movble member.

References Cited
UNITED STATES PATENTS

| | | | |
|---|---|---|---|
| 1,617,662 | 2/1927 | Ackroyd | 33—158 |
| 2,607,990 | 8/1952 | Payamps | 33—189 X |
| 2,934,829 | 5/1960 | Bohn | 33—189 |
| 3,230,631 | 1/1966 | Skidmore | 33—189 |
| 3,403,445 | 10/1968 | Sauer | 33—1 C |

WILLIAM D. MARTIN, JR., Primary Examiner

U.S. Cl. X.R.

33—1 C, 189; 350—116; 356—170